May 20, 1924.                                                    1,495,030
P. MÜLLER
ALTERNATING CURRENT MACHINE
Filed Aug. 29, 1921        11 Sheets-Sheet 1
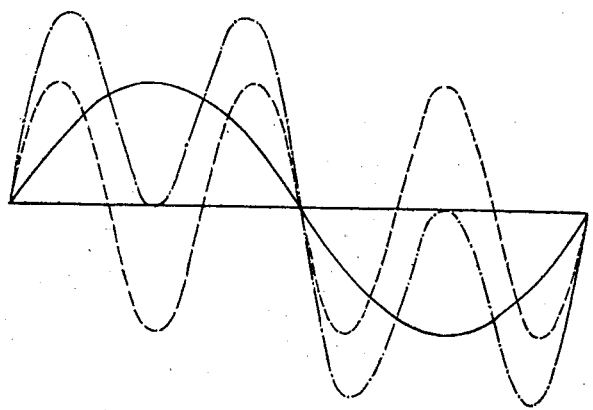
Fig. 1ᵃ
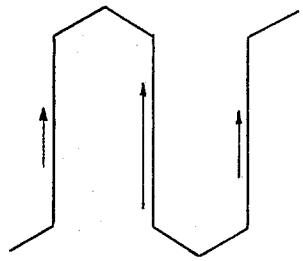
Fig. 1ᵇ
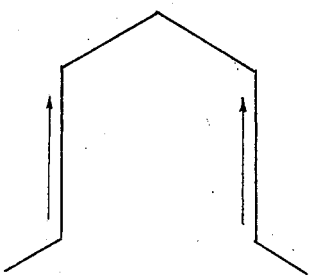
Fig. 1ᶜ
Inventor
Paul Müller
By
[signature]
Attorney May 20, 1924.
P. MÜLLER
1,495,030
ALTERNATING CURRENT MACHINE
Filed Aug. 29, 1921    11 Sheets-Sheet 2
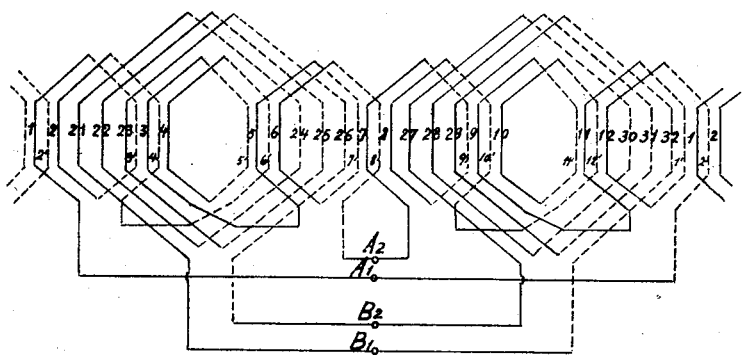
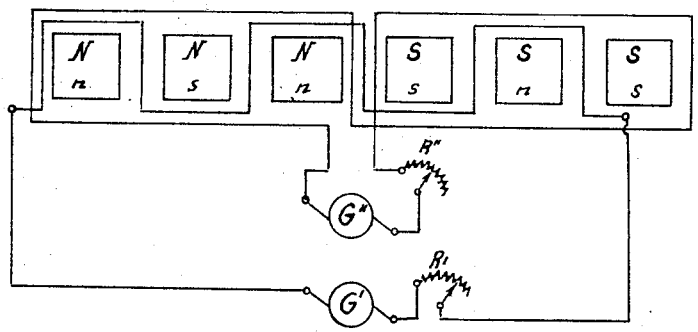
Fig.2
Inventor
Paul Müller
By,
                   Attorney May 20, 1924.
P. MÜLLER
1,495,030
ALTERNATING CURRENT MACHINE
Filed Aug. 29, 1921  11 Sheets-Sheet 3
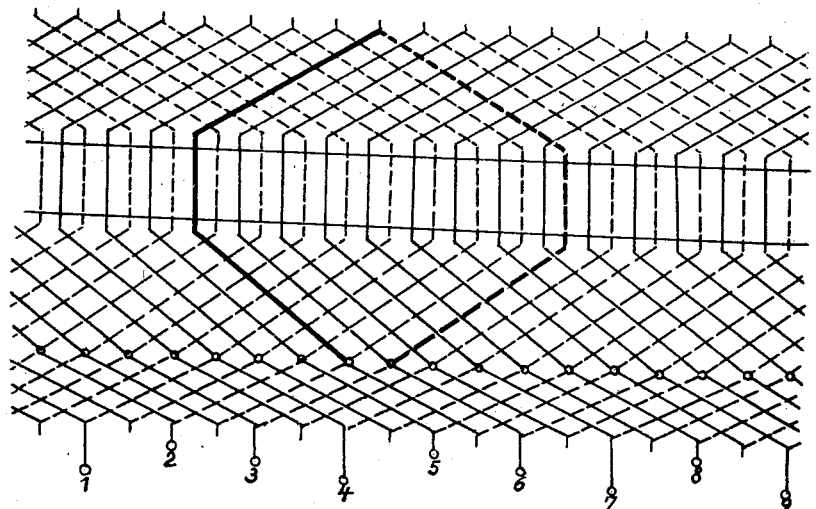
Fig.3ª
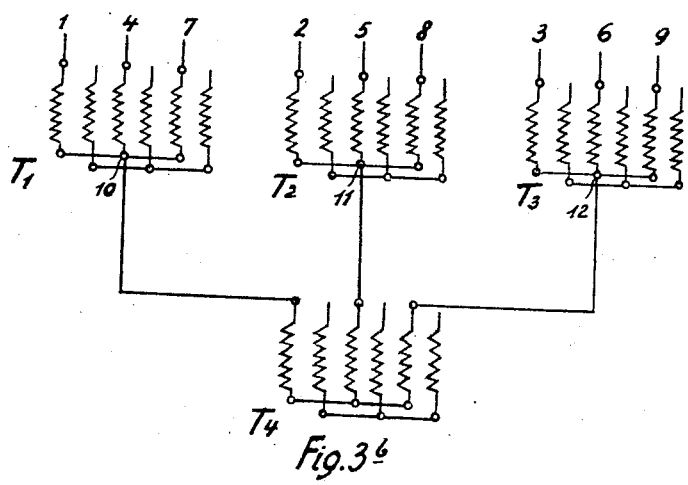
Fig.3ᵇ
Inventor
Paul Müller
By
Attorney May 20, 1924.

P. MÜLLER 1,495,030

ALTERNATING CURRENT MACHINE

Filed Aug. 29, 1921    11 Sheets-Sheet 4

Inventor
Paul Müller
By
Attorney

May 20, 1924.

P. MÜLLER 1,495,030

ALTERNATING CURRENT MACHINE

Filed Aug. 29, 1921  11 Sheets-Sheet 5

Inventor
Paul Müller
By
Attorney

May 20, 1924.  
P. MÜLLER  
1,495,030  
ALTERNATING CURRENT MACHINE  
Filed Aug. 29, 1921  
11 Sheets-Sheet 6

Inventor  
Paul Müller  
By  
James L. Norris  
Attorney

May 20, 1924.  1,495,030

P. MÜLLER

ALTERNATING CURRENT MACHINE

Filed Aug. 29, 1921   11 Sheets-Sheet 7

Inventor
Paul Müller
By
Attorney

May 20, 1924.   1,495,030
P. MÜLLER
ALTERNATING CURRENT MACHINE
Filed Aug. 29, 1921   11 Sheets-Sheet 8

Inventor
Paul Müller
By
Attorney

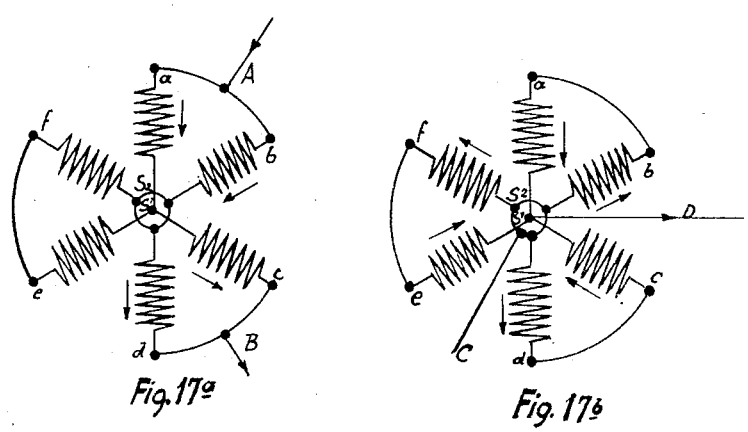
Fig. 17ª   Fig. 17ᵇ
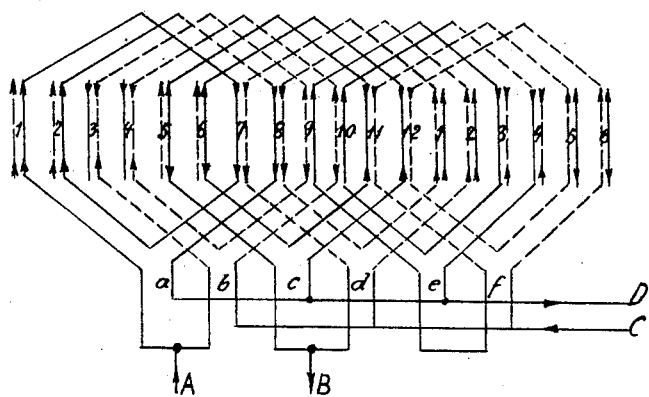
Fig. 18

May 20, 1924.

P. MÜLLER 1,495,030

ALTERNATING CURRENT MACHINE

Filed Aug. 29, 1921 11 Sheets-Sheet 10

Inventor
Paul Müller
By
Attorney

May 20, 1924.

P. MÜLLER 1,495,030

ALTERNATING CURRENT MACHINE

Filed Aug. 29, 1921    11 Sheets-Sheet 11

Inventor
Paul Müller
By
Attorney

Patented May 20, 1924.

1,495,030

UNITED STATES PATENT OFFICE.

PAUL MÜLLER, OF BERLIN, GERMANY, ASSIGNOR, BY MESNE ASSIGNMENTS, TO GENERAL ELECTRIC COMPANY, A CORPORATION OF NEW YORK.

ALTERNATING-CURRENT MACHINE.

Application filed August 29, 1921. Serial No. 496,582.

(GRANTED UNDER THE PROVISIONS OF THE ACT OF MARCH 3, 1921, 41 STAT. L., 1313.)

*To all whom it may concern:*

Be it known that I, PAUL MÜLLER, a citizen of the German Empire, residing at Berlin, Germany, have invented certain new and useful Improvements in Alternating-Current Machines (for which I have filed applications in Germany, December 8, 1915 (B. 80,-681; December 21, 1915 (B. 80,773); March 2, 1916 (B. 81,198); April 22, 1916 (B. 81,-506); April 25, 1916 (B. 81,512); April 25, 1916 (B. 81,513); February 8, 1917 (B. 83,-275); February 13, 1917 (B. 83,314); March 31, 1917 (Patent Nr. 308,142); June 21, 1918 (B. 86,647); June 29, 1918 (B. 86,723); July 12, 1918 (B. 86,817); Belgium, November 27, 1916 (Patent Nr. 271,752); England, December 6, 1916 (Patent Nr. 102,618); France, December 1, 1916 (Patent Nr. 513,-329); Holland, February 11, 1921; February 18, 1921; Norway, December 4, 1916 (Patent Nr. 28,042); December 19, 1917 (Patent Nr. 28,824); September 8, 1917 (Patent Nr. 28,-553); March 5, 1918 (Patent Nr. 29,106); June 19, 1919 (Patent Nr. 30,368); Italy, December 2, 1916 (Patent Nr. 157,013); December 7, 1917; (Patent Nr. 163,445); Austria, December 2, 1916; December 7, 1917; August 29, 1917; February 21, 1918; June 7, 1919; Hungary, November 28, 1916 (Patent Nr. 72,707); September 13, 1917 (Patent Nr. 74,063); Sweden, November 30, 1916 (Patent Nr. 44,187); December 14, 1917 (Patent Nr. 47,212); August 30, 1917 (Patent Nr. 47,336); February 20, 1918 (Patent Nr. 48,613); June 12, 1919 (Patent Nr. 47,213); Switzerland, November 24, 1916 (Patent Nr. 86,093); January 11, 1918 (Patent Nr. 90,626); August 22, 1917; February 19, 1918; August 27, 1919 (Patent Nr. 90,627); Czechoslovakia, January 5, 1920 (Patent Nr. 3,735); January 15, 1920; January 7, 1920; January 15, 1920; January 7, 1920), of which the following is a specification.

My invention relates to an alternating current machine and its object is to make possible the transformation of an alternating current into an alternating current of a different frequency, or the simultaneous generation of two alternating currents of different frequency at any uneven ratio of $(2n+1):1$ of frequencies. For this purpose the machine is fitted with exciting windings for two primary, or inductor, fields, the number of poles of which have the ratio of $(2n+1):1$; also with two secondary, or armature, windings of which the one is induced by the field of the higher, the other by the field of the lower, number of poles. To attain this end, the one armature winding is composed of groups of $2n+1$ conductors, which latter are spaced at the pitch of the high number of poles and connected in series, the other of groups of two conductors connected in series and pitched corresponding to an even number of poles of the field of the high number of poles.

For practical reasons, the inductor windings in such a machine are arranged on a common field magnet body and the armature windings on a common armature core. In this case, the inductor windings on the one side, and the armature windings on the other, can each be connected up mechanically into one common winding which may be fitted with suitable terminals for the alternating currents of different frequencies.

Otherwise, the machine can be constructed as either a synchronous or asynchronous machine in respect of both currents of different frequencies, or as a synchronous machine in respect of the one alternating current and as an asynchronous machine in respect of the other. In the first of these cases, the two fields of different numbers of poles are both excited by a continuous current; in the second case the excitation is effected in the manner of the well-known asynchronous machine; in the third the one field is excited by a continuous, the other by an alternating current.

The ratio of frequency can be, as already mentioned, any uneven ratio, hence the frequencies of the single alternating currents can differ correspondingly. The same holds good for the number of phases of the two alternating currents; these may have the same or different numbers of phases. In practice, however, the special case is of particular importance in which a three-phase current of 50 periods and a single-phase current of 16⅔ periods are concerned; in this case, the ratio of the number of poles of the field of the high pole number to that of the field of the low pole number must be 3:1.

The invention will best be understood by reference to the accompanying drawings, in which—

Figure 1a shows diagrammatically the superimposition of two fields differing in an uneven ratio with respect to the number of poles;

Figures 1b and 1c illustrate the principle according to which the corresponding armature windings are built;

Figures 2 and 16 show constructions of the machine with the field and armature windings developed on a plane surface;

Figures 3a to 15 show a mechanically common armature winding in various forms of construction; also the means for separating the alternating currents of different frequencies;

Figures 17 and 18 show the construction of a mechanically common exciting winding for continuous current excitation;

Figure 4:
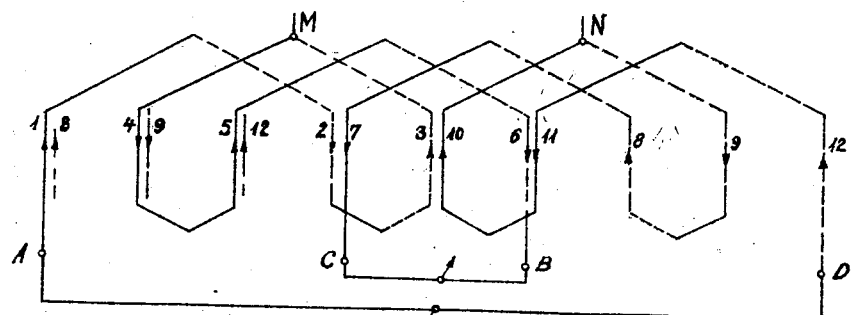

If there is no specific mention to the contrary, the ratio of the numbers of poles in these figures is always that of 3:1 for the alternating currents of different frequencies.

In Figure 1a, the field curves of two such exciter fields are illustrated, the full line indicating the field of the low pole number, the dotted line that of the high pole number, and the dot-and-dash line the resulting field. The form of the resulting field naturally remains constant only if the two component fields have a fixed relative position; if that is not the case, the dot-and-dash line represents only an instantaneous form of the curve.

The secondary winding for the high periodicity must be so arranged that the field of the low pole number cannot generate any voltage in it. The conductors are therefore distributed, and connected, in the manner indicated in Figure 1b. This figure shows three conductors, spaced at a pole pitch of the field of the high pole number, and connected in series. All these three conductors lie under the same pole of the field of the low pole number. By this field, therefore, three voltages are generated in them of the same direction, which are represented by arrows as to direction and amounts. In consequence of the connection of the conductors these voltages are opposed to each other and neutralize each other. For, the voltage in each single conductor being proportional to the flux at that particular point, we get, with a sinusoidal field curve, and with the angular distance of the first conductor from the zero-point of the field of the low pole number being $\varphi$ a resulting voltage for the three conductors which must be proportional to the value of $$\sin\varphi - \sin(\varphi+60) + \sin(\varphi+120°)$$

This value is —0 for each value of $\varphi$. Accordingly, the sum of the tensions in the three conductors indicated in Figure 1b equals zero; likewise that of the conductors which lie under the next pole of the field of the low pole number and which are connected in series with the former. Consequently, with the arrangement shown, the winding for the high periodicity is in no way influenced by the field of the low number of poles.

It can be easily shown that the same thing holds good when the high pole number is 5, 7, 9, or, generally speaking, $2n+1$ times that of the low pole number. In all these cases the influence on the winding from the field of the low number of poles can be obviated by spacing the conductors at the pole pitch of the field of the high pole number and connecting 5, 7, 9, $2n+1$ of them respectively in series.

The winding for the low frequency ought to be so arranged that each two conductors which are spaced at a pole pitch of the field of the low pole number, are connected in series if the full effect from this field is to be obtained. However, as will be seen by reference to Fig. 1a, in that case the voltages induced by the field of the high number of poles would add themselves up, thus the windings would receive an undesirable influence from the field of the high number of poles beside the desired influence from the field of the low number of poles. To avoid the former, the conductors are to be arranged as shown in Fig. 1c. According to this, two conductors are connected in series which are spaced at the double pole pitch of the field of the high pole number. This field therefore generates in both conductors tensions of equal strength and direction, which, by virtue of the series-connection of the conductors, oppose and neutralize each other. In this relation nothing is altered if the two conductors which are connected in series, are spaced at the pitch not of two but, may be, four poles of the field of the high number of poles. The only essential thing is that their distance equal the pitch of an even number of poles of this field. In most cases it will be useful, however, to arrange the winding so that the throw is less than the pole pitch of the field of the low pole number. Accordingly, if the field of the higher pole number contains 5, 7, 9, or, generally speaking, $2n+1$, times as many poles as the field of the lower pole number, then the distance of the two conductors which are connected in series will be chosen to equal 4 (6), 6 (8), 8 (10), 2n (2n+2) times the pole pitch of the field of the high pole number.

Obviously it is not necessary, that the conductors thus to be connected in series be connected immediately one with the other:—it is permissible that a number of them be connected in any convenient way, and that groups be formed which are connected in series with one another; but every armature winding must be reducible to numbers of groups containing conductors which are connected in series and which, by their position and interconnection, fulfil the conditions set out in the foregoing.

Figure 2 shows the construction of inductor and armature for such a machine of the single-phase synchronous type. There are two field windings on a common magnet body; the one is fed by the exciter G′, which produces a six-pole field having the poles $n, s$, while the other is fed by the exciter G″, which produces a two-pole field having the poles N, S. R′ and R″ are field regulating resistances. The two armature windings are arranged on one common armature core, that for the high pole number consisting of bars 1, 2, 3, 4, 5, 6, 7, 8, 9, 10, 11, 12, 1′, 2′, 3′, 4′, 5′, 6′, 7′, 8′, 9′, 10′, 11′, 12′, that for the low pole number of bars 21, 22, 23, 24, 25, 26, 27, 28, 29, 30, 31, 32. In the armature winding for the high pole number we find, beginning at $A_1$, and ending at $A_2$, that the following bars are connected in series in the order given:—bars 1—3′—2—4′—6′—4—5′—3—5—7′—6—8′ and bars 2′—12—1′—11—9—11′—10—12′—10′—8—9′—7 respectively. Since bars 1′, 2′, 3′, etc., are each placed in the same slot with the bar of the corresponding number but without index, viz., 1, 2, 3, etc., the throw of this winding amounts to a pole pitch of the field of the high pole number. Each of the three bars 1—3—5 (and similarly 2—4—6 and 3′—5′—7′ and 4′—6′—8′) lies at a distance from the other which equals the pole pitch of the field of the high pole number; consequently the corresponding section of the winding is actually reducible to four groups consisting of three conductors connected in series and having a distance from each other which equals one pole pitch of the field of the high hole number, which corresponds to the conditions laid down for the armature winding of the high pole number at a ratio of 3 : 1 for the pole numbers. The same thing holds good for the other section of the winding, which lies between $A_1$ and $A_2$; thus the two sections are connected in parallel and $A_1$ and $A_2$ are the terminals for the current of the high frequency.

Correspondingly, the armature winding for the low pole number, which lies between points $B_1$ and $B_2$, is composed of two parallel winding sections, the one consisting of bars 21, 22, 23, 24, 25, 26, the other of bars 27, 28, 29, 30, 31, 32. Of the six bars composing each of the two winding sections each two are always at a distance from each other which equals double the pole pitch of the field of the high pole number, and consequently each winding section contains three groups of two conductors each which lie at a distance from each other which equals the pitch of two poles of the field of the high number of poles, which corresponds to the conditions laid down for the armature winding of the low number of poles. Accordingly, points $B_1$ and $B_2$ are the terminals for a single-phase alternating current of which the frequency is ⅓ of the frequency of the alternating current for which $A_1$ and $A_2$ are the terminals.

Instead of employing a separate armature winding for each of the currents of different periodicity, these windings can be mechanically united to one common winding, whereby a considerable saving of material can be effected. In this common winding the currents of different frequency appear simultaneously and superimpose themselves on one another, so that it becomes necessary to effect a separation of them by some suitable means. This can be done in various ways.

Figure 3ª, for example, shows the arrangement of a machine, in which the currents of different periodicity, which appear in the common winding, are separated by external means, the supposition being that both currents are three-phase and that the field for the lower frequency has one pair, that for the higher frequency three pairs of poles. According to this arrangement the winding is arranged as a continuous winding of the drum type similar to the ordinary armature windings, the throw equalling one pole pitch of the field of the low pole number. On this winding nine tap-offs, evenly distributed, are provided corresponding to the product of number of pairs of poles times number of phases of the field of the high pole number.

The tap-offs 1—4—7 are points of the same potential with respect to the high frequency, likewise the tap-offs 2—5—8 and 3—6—9; for, with regard to each to these groups of tap-offs, the conditions laid down in the foregoing for the winding of the low frequency are fulfilled. Now, if, for example, the tap-offs 1—4—7 were connected together, a current of the high frequency could not appear in the connection. On the other hand, these tap-offs do not have the same potential with respect to the low frequency; for this they represent the terminals of a three-phase system. Further, between the three groups of tap-offs there exists a difference of potential for both the high and the low frequency, while it is possible therefore to get the low frequency by itself through these tap-offs alone, (if, for instance, the current is taken off at points 1—4—7 of the winding,) it is not possible in the same way to get the high frequency as well, (for instance by taking off the current at the points 1—2—3). However the separation of the high frequency from the low frequency can be effected if the tap-offs are connected to a system of transformers in the manner shown in Figure 3$^b$. According to this, the tap-offs 1—4—7 are connected to the terminals of the primary winding of a transformer $T_1$, the tap-offs 2—5—8 to the primary terminals of a second transformer $T_2$, and the tap-offs 3—6—9 to the primary terminals of a third transformer $T_3$. Each of those three primary windings is connected in star, and the starpoints 10, 11, 12 are connected to the primary terminals of a fourth transformer $T_4$. Then the straight current of the high frequency can be taken off at the secondary terminals of this fourth transformer, since the low frequency does not generate any difference of potential between the three starpoints 10, 11, 12; and the straight current of the low frequency appears in the secondary windings of the three other transformers.

The use of a separate system of transformers, however, is not necessary and the currents of different periodicity can be taken off directly at the tap-offs of the armature winding of the machine if an arrangement be chosen by which, for each system of tap-offs which belongs together, the winding is built up in accordance with the rules laid down in the foregoing for separate windings. An arrangement of the winding which serves this purpose is shown in Figure 4, and in this case it is assumed, that the two currents of different frequency are single-phase currents and that the machine again has two poles for the current of the low frequency and six poles for the current of the high frequency. The winding is shown to consist of 12 conductors, placed in six slots, each of which contains two conductors, each conductor being connected to, and forming one complete spool with, one lying at the distance of one pole-pitch of the field of the low pole number.

These spools are joined together to form winding sections in such a manner, that conductors 1, 2, 3, 4, 5, 6 are connected in series between points A and B, and conductors 7, 8, 9, 10, 11, 12 between points C and D. and that both winding sections are one pole pitch of the field of the low pole number apart. Points A and D are connected together; likewise points C and B, while in the middle of the two winding sections, between conductors 3 and 4, and 9 and 10 respectively, the tap-offs M and N are provided. Thus each of the two winding sections A—B and C—D is composed of two groups of three conductors connected in series—corresponding to the ratio of 3:1 of the number of poles—which are spaced at the pole pitch of the field of the high pole number. For the winding section A—B, for instance, bars 1, 4, 5, form one such group, and bars 2, 3, 6 the second group. Between points A, D and C, B, therefore, a voltage of the high frequency can be taken off, while a voltage of the low frequency does not appear there. On the other hand, the winding between points M and N also consists of two parallel winding sections, one of which is formed by bars 4, 5, 6, 7, 8, 9, the other by bars 3, 2, 1, 12, 11, 10; each of these winding sections can be considered as composed of three groups of two conductors which are two pole pitches of the field of the high pole number apart and connected together in series. Bars 4 and 7, 5 and 8, 6 and 9, for instance, form such groups. The winding between points M and N, therefore, corresponds to a winding of the low frequency, and at points M and N a voltage of the low frequency, but none of the high frequency appears. In this way it is possible to get the currents of different periodicity separated merely by making connections at points A, D and C, B on the one hand and at points M, N on the other.

Figure 5:
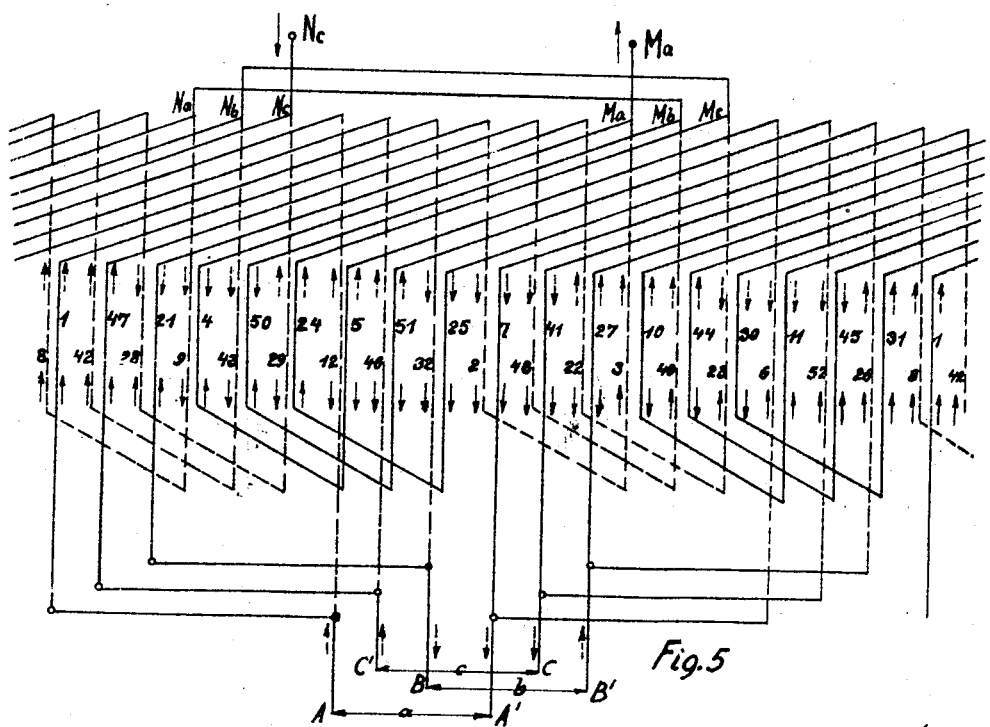

Figure 5 shows the complete diagram of such a winding, for a machine which, for instance, is to generate simultaneously three-phase current of 50 periods and single-phase current of $16\frac{2}{3}$ periods. Accordingly there are three single-phase windings, displaced against one another by an angle of 60° with reference to the field of the high number of poles, and built up after the principle shown in Figure 4. The conductors belonging to phase $a$ are designated with figures beginning with 1, those belonging to phase $b$ with figures beginning with 21, and those belonging to phase $c$ with figures beginning with 41. In each winding for each phase tap-offs are arranged at the middle points of the parallel branch circuits. Thus, for phase $a$, the tap-offs between points A and A' are $M_a$ and $N_a$; for phase $b$, between points B and B', $M_b$ and $N_b$; for phase $c$, between points C and C', the tap-offs are $M_c$ and $N_c$. Points A and A', B and B', C and C', form the terminals for the 50 period current; points $M_a$ and $N_a$, $M_b$ and $N_b$, $M_c$ and $N_c$, the terminals for the $16\frac{2}{3}$ period current. Since the $16\frac{2}{3}$ period current is to be a single-phase current, points $N_a$ and $M_b$, $N_b$ and $M_c$ are connected together, so that the different phases for the $16\frac{2}{3}$ period current are in series; points $M_a$ and $N_c$ are then the terminals for this current. At the instant, at which the three-phase current has its maximum in phase $a$, we get the distribution of currents which is indicated by full arrows for the single-phase current and by dotted arrows for the three-phase current.

Figure 6:
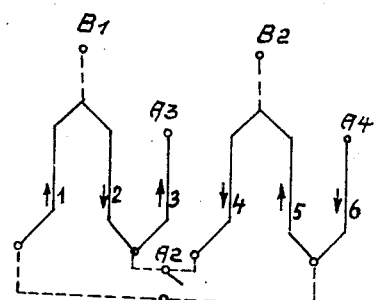
Figure 7:
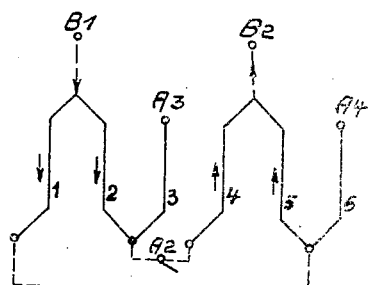

A particular advantageous arrangement of the common armature winding can be obtained by utilizing a part of the winding for the high frequency as winding for the low frequency. The arrangement of such a winding is illustrated in Figures 6 and 7. According to this, the winding consists of six conductors placed at a distance from each other, which equals a pole-pitch of the field of the high pole-number. These six conductors form two groups 1—2—3, 4—5—6, each of which is composed of three conductors, lying one pole-pitch of the field of the high pole-number apart, and which are displaced against each other by a pole-pitch of the field of the low pole-number. The beginning of the first conductor 1 is connected with the beginning of the sixth conductor 6, and the beginning of the third conductor 3 with the beginning of the fourth conductor 4. Between points $A_1$ and $A_3$ on the one hand, and points $A_2$ and $A_4$ on the other hand, a straight single-phase voltage of high frequency appears. At the same time, points $B_1$, $B_2$ at the connecting points of conductors 1, 2 and conductors 4, 5 form the points of connection for a single-phase current of the low frequency, since each of the paths for this current 1—5 and 2—4 is composed of conductors connected in series lying at a distance from each other which equals an even number of poles of the field of the high pole-number. The direction of the high frequency current is indicated by arrow-heads in Fig. 6, that of the low frequency current in Figure 7.

Figure 8:
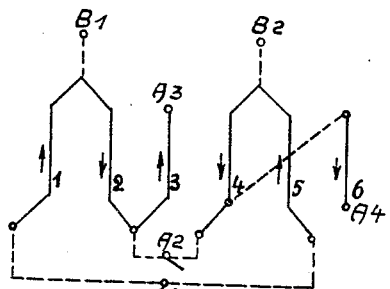
Figure 9:
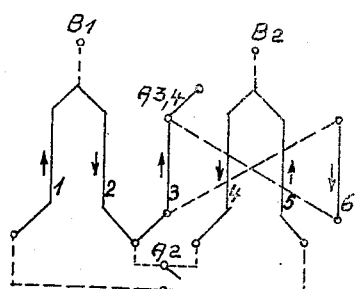

With this arrangement there remains the unfavourable circumstance, that the points of connection $A_1$, $A_2$, $A_3$, $A_4$ for the high frequency current have a different potential, and that they cannot for this reason be connected in parallel. This can, however, be easily remedied, by changing in the one group the connection of the conductor, which does not carry any current of the low frequency, as shown in Fig. 8, while all the other parts of the arrangement remain as before. In this figure the end of conductor 6 is connected with the beginning of conductor 4. Consequently the current of high frequency flows from $A_1$ through conductors 1, 2, 3 to $A_3$, and through conductors 4, 5, 6 to $A_4$, while $A_2$ is no longer the connecting point. Since points $A_3$ and $A_4$ now have the same potential, they can be joined to a common connecting point $A_{3,4}$ as shown in Fig. 9. The arrow heads, which are shown, indicate the direction of the high frequency current.

Figure 10:
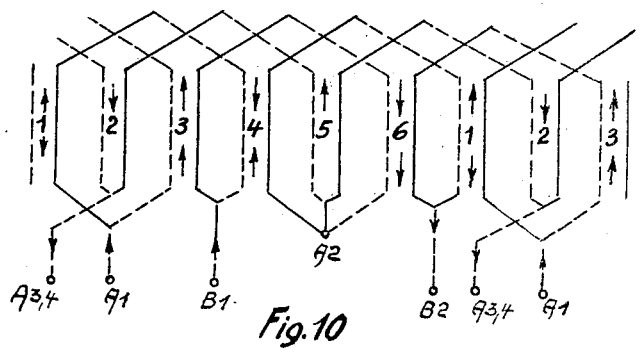

In the actual construction of the machine the conductors belonging to groups 1—2—3, 4—5—6 will in general for practical reasons not be connected immediately one behind the other, but such conductors as lie apart at a distance, which equals a pole-pitch of the field of the low pole-number, will be joined into one turn, and, further, several conductors will be placed one above the other in one slot. A single-phase winding completed in this manner is shown in Fig. 10. $A_1$ and $A_{3,4}$ again are the connecting points for the high frequency current, $B_1$ and $B_2$ the connecting points for the low frequency current. The direction of the high frequency current is indicated by the upper arrows, that of the low frequency current by the lower arrows.

Figure 11:
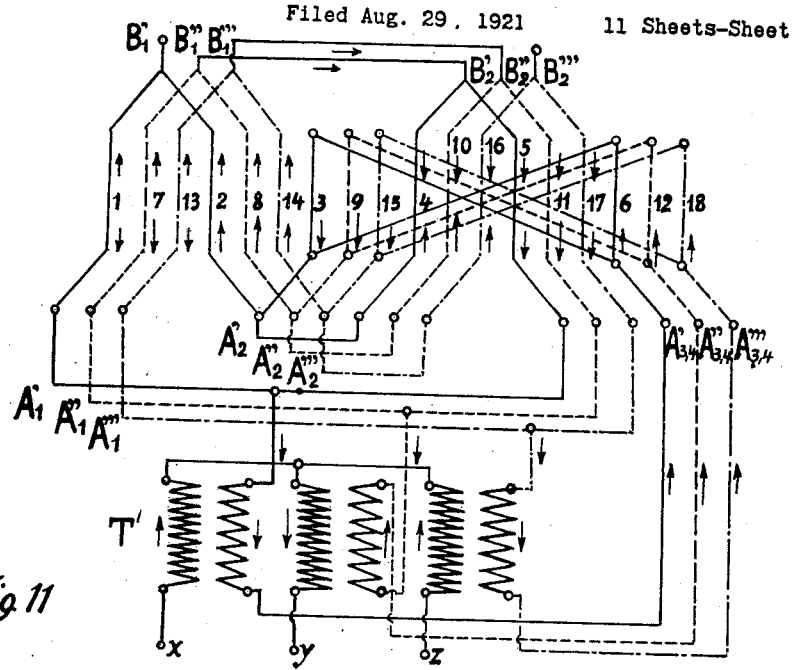
Figure 12:
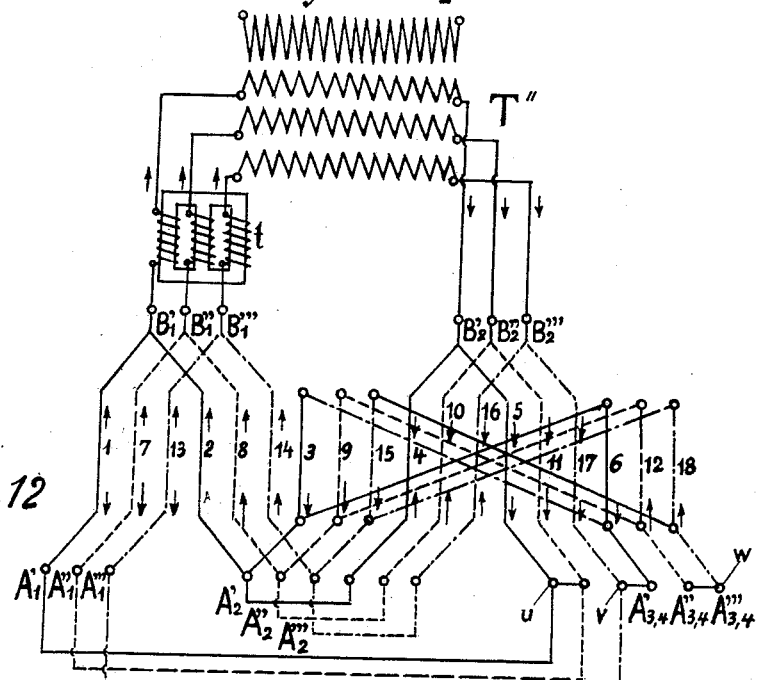

If the high frequency current is to be three-phase, and the low frequency current single-phase, which case in practice is of particular importance, an arrangement as shown in Figs. 11 and 12 can be employed. According to these figures the armature winding consists of single-phase windings 1—2—3—4—5—6, 7—8—9—10—11—12, 13—14—15—16—17—18, according to Fig. 9, which are displaced against each other by 60° each with reference to the field of the high pole-number, and the connecting points of which have been designated $A'_1$—$A'_2$—$A'_{3,4}$—$B'_1$—$B'_2$, $A''_1$—$A''_2$—$A''_{3,4}$—$B''_1$—$B''_2$, $A'''_1$—$A'''_2$—$A'''_{3,4}$—$B'''_1$—$B'''_2$, according as they belong to the windings of different phase. In Fig. 11 the three windings 1—2—3—4—5—6, 7—8—9—10—11—12, 13—14—15—16—17—18 for the high frequency current are completely separated, and the connecting points $A'_1$—$A'_{3,4}$, $A''_1$—$A''_{3,4}$, $A'''_1$—$A'''_{3,4}$ which belong together are connected with each other merely through the low voltage windings of a transformer T', at whose terminals $x$, $y$, $z$ a high voltage three-phase current of the high frequency can be taken off. In order to obtain the correct phase displacement of 120 electrical degrees for the three-phase current, the low voltage winding of the transformer between connecting points $A''_1$ and $A''_{3,4}$ is connected up in the opposite way as the other two low voltage windings. Of the connecting points $B'_1$—$B'_2$, $B''_1$—$B''_2$, $B'''_1$—$B'''_2$ for the low frequency current $B'_2$ and $B''_1$, also $B''_2$ and $B'''_1$ are immediately connected together, so that the three winding sections for the low frequency are connected in series. Then the single-phase current of the low frequency can be taken off at the connecting points $B'_1$ and $B'''_2$. The direction of the current for the single-phase alternating current is indicated by the upper line of arrows, for the three-phase current by the lower line of arrows, the assumption for the latter being that the middle phase is carrying the maximum current.

The difference between Figs. 11 and 12 lies in this, that in the latter the connecting points $A'_1$—$A''_1$, $A'''_1$—$A'_{3,4}$, $A''_{3,4}$—

$A'''_{3,4}$ are connected immerdiately together. The windings for the high frequency are thus connected in delta, and the three-phase current of the high frequency can be obtained at the terminals $u, v, w$. Between the points of connection $B'_1-B'_2$, $B''_1-B''_2$, $B'''_1-B'''_3$ now a low voltage winding of a transformer $T''$ is connected, and there is no immediate connection. In consideration of the phase displacement which exists between the single voltages of the low frequency a choke-coil $t$ is placed into the circuit of the three low voltage windings; the three windings of the choke-coil are arranged on the legs of a three-legged iron core and thus magnetically interlinked. This choke-coil has the tendency of evenly distributing the single-phase current over the three low voltage windings and thus equalizes the differences between the phases. It will be useful to distribute its three windings in zig-zag fashion over various legs instead of having them each placed on one leg, as shown in the diagram.

Figure 13:
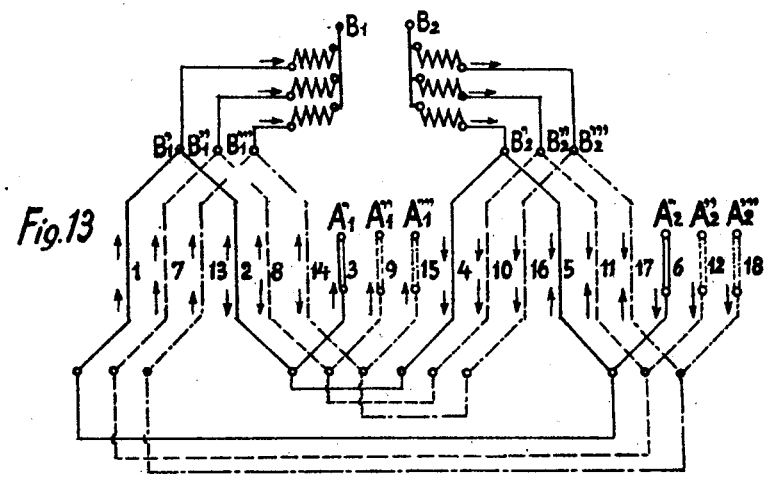

The result which is obtained through the connections shown in Figs. 11 and 12 can be reached more simply and advantageously by employing the arrangement indicated in Fig. 13. The three single-phase windings 1—2—3—4—5—6, 7—8—9—10—11—12, 13—14—15—16—17—18 again are displaced by 60° of the field of the high pole number, and arranged essentially as in Figs. 6 and 7. There is this difference, however, that conductors 3—9—15, 6—12—18 which do not carry the single-phase current are each halved and the halves connected in paralled, while at the same time the three ends of these conductors 3—9—15, 6—12—18 form the connecting points $A'_1-A''_1-A'''_1$, $A'_2-A''_2-A'''_2$ for the high frequency current. For the single-phase current the three connecting points $B'_1-B''_1-B'''_1$ are combined to one single connecting point $B_1$ through a choke-coil, likewise the connecting points $B'_2-B''_2-B'''_2$ to one connecting point $B_2$. The choke-coils correspond to the choke-coil $t$ in Fig. 12 and are built up in the same way, it being, however, useful to arrange both choke-coils on one common iron frame. Each of the connecting points $B_1$ and $B_2$ of the single-phase system forms at the same time the interlinking point of the multiple phase system, and the winding of Fig. 13 therefore represents at the three-phase side a symmetrical six-phase system interlinked at a neutral point. For the sake of clearness this is shown again diagrammatically in Fig. 14 in which spools are drawn in the place of the conductors drawn in Fig. 13, while everything else remains unchanged.

Figure 14:
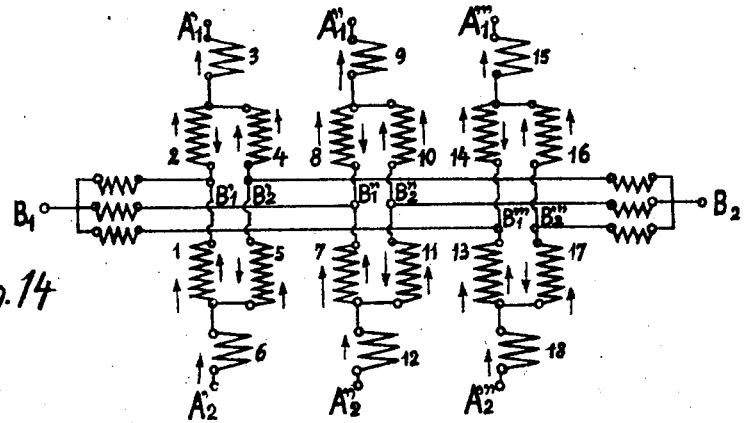
Figure 15:
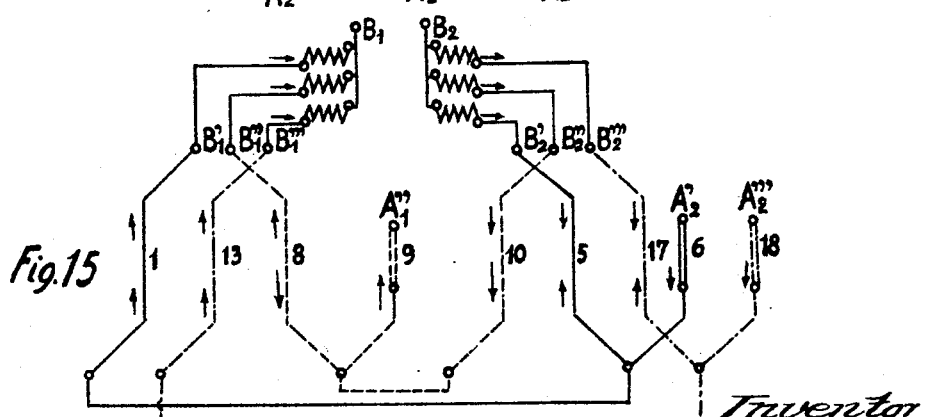

Between points $A''_1, A'_2, A'''_2$ and on the other hand between points $A'_1, A'''_1, A''_2$ of Figs. 13 and 14 a straight three-phase voltage appears, as will be readily seen. Each of these systems is interlinked in star with two star points $B_1$ and $B_2$, and consequently each of the two parallel winding sections of each phase is as it were interlinked independently. Accordingly at the two different groups of connecting points different currents can be readily taken off; if required, one of the groups can be left entirely without current, and therefore the one group can be entirely left out, as is shown in Fig. 15. Here the bars 2—3—4, 7—11—12, 14—15—16 are omitted, while no changes in the connections of the other bars have been made from that shown in Fig. 13; $B_1$ and $B_2$ are again the terminal points for the single-phase system, while $A''_1, A'_2, A'''_2$ are now the terminal points for the three-phase system. Now the three-phase current of high frequency also must flow through the choke-coils, but the ampere-turns generated thereby neutralize each other, if, as already said for Fig. 13, the two choke-coils are arranged on one common iron core, and then they do not influence the action of the choke-coils.

For the generation of the exciter fields separate windings can be used, in which case it is possible to regulate the two fields independently. If, however, parts of the winding which carry currents continuously in opposite directions lie in the same slots, it is generally useful to combine these. In practise this applies only to the case that the machine is synchronous in respect of both frequencies and that the two fields are excited by continuous current. In this case the two field windings are arranged on one common inductor, in which case by the combination of the two windings a saving in material is effected, while on the other hand the regulation of the single fields can no longer be carried out independently. The common exciter winding can then be arranged in such manner, that separate exciting currents are brought to suitable connecting points, or alternatively that one common exciter current can flow through the winding and produce both fields.

Figure 16:
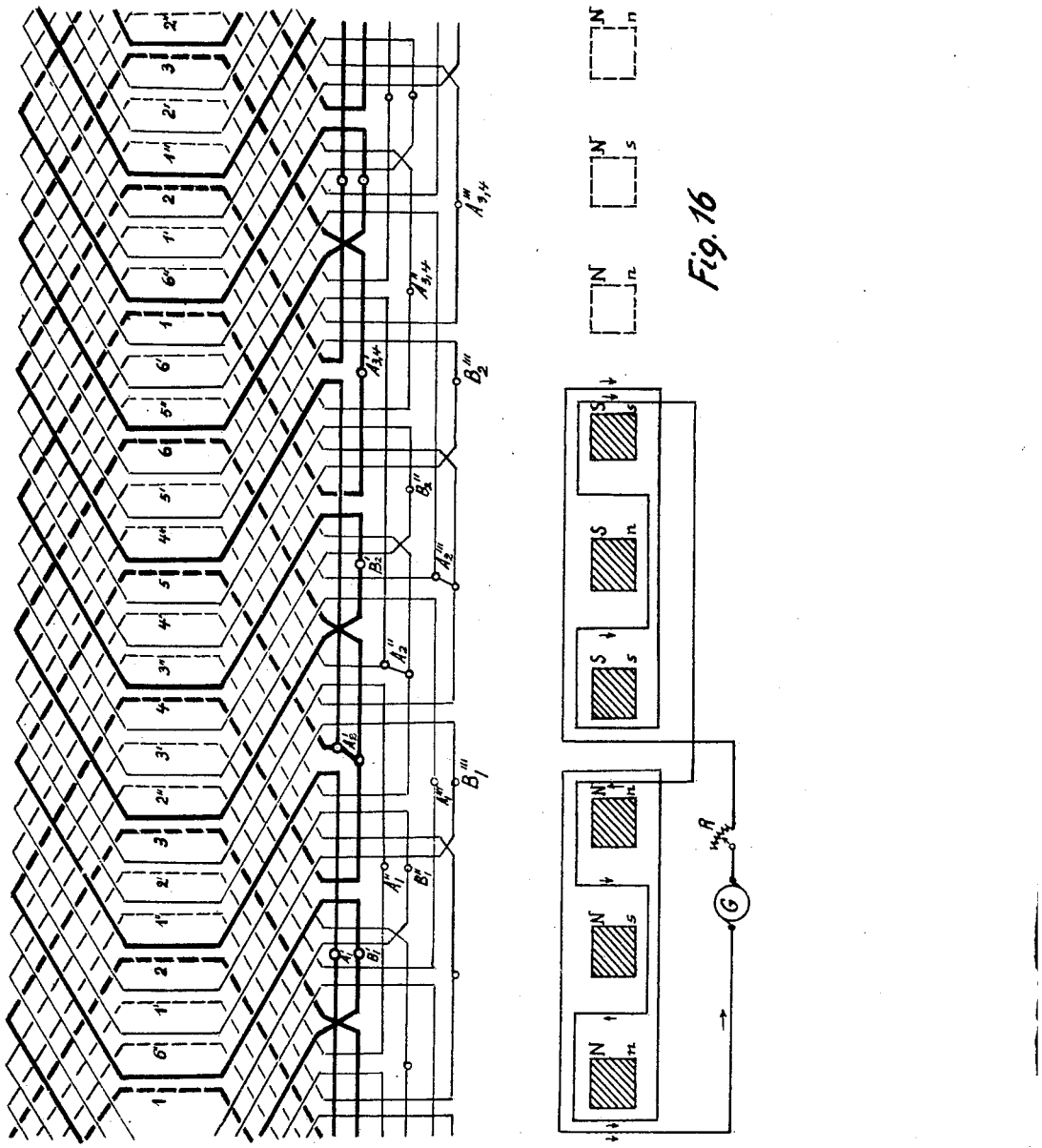

The complete diagram of a synchronous machine with a common armature winding and a common exciter winding is shown in Fig. 16, the supposition being that the high frequency current is a three-phase alternating current and the low frequency current a single-phase current. The excitation of the six-pole and the two-pole direct current field is effected by a common current, the exciter winding being suitably distributed and fed by a direct current source G through a regulating resistance R. The common armature winding is again composed of three phase windings, which are displaced against each other by 120 electrical degrees with respect to the field of the high pole number. Each of these phase windings has a throw which approximately equals a pole-pitch of the field of the low pole number and is composed of six pairs of conductors, each pair consisting of one upper and one lower bar in the same slot. For the one phase the pairs of conductors 1—2—3—4—5—6, for the second the pairs of conductors 1'—2'—3'—4'—5'—6' and for the third the pairs 1"—2"—3"—4"—5"—6" are used. As will be readily seen by reference to the phase winding which is made prominent by being drawn with heavy lines, there are on the one hand between points $A'_1$ and $A'_{3,4}$ two winding sections, each of which is built up of two groups of three conductors connected in series and having a distance from each other which equals a pole-pitch of the field of the high pole number; on the other hand there are between points $B_1'$ and $B_2'$ two winding sections, each consisting of two groups of two conductors connected in series and having a distance from each other which equals an even number of pole-pitches of the field of the high pole number. The other two phase windings are arranged in a corresponding manner. Points $A_1'$—$A_{3,4}'$, $A_1''$—$A_{3,4}''$, $A_1'''$—$A_{3,4}'''$ thus form the connecting points for a three-phase current and points $B_1'$—$B_2'$, $B_1''$—$B_2''$, $B_1'''$—$B_2'''$ the connecting points for a single-phase alternating current of a frequency which is a third of that of the three-phase current. They correspond to the points in Figs. 11 and 12 which are marked with the same letters, and therefore systems of transformers can be connected up to these points as indicated in these figures.

If the machine is a synchronous machine with respect to both alternating currents both field windings are excited by a direct current and have a fixed relation to each other. In that case the fields will combine with the fields produced by the armature windings which are assumed to be alternating current windings, and two resulting fields will appear; the maximum values of the field density are dependent on the relative position of these two resulting fields. In order to keep the iron-core and, consequently, the size and weight of the machine as small as possible it will be desirable to bring the two resulting fields in such relative position that the resulting maximum field density is as small as possible. That will be obtained if the positive maximum of the one field coincides with the negative maximum of the other field. It must, however, be taken to account that each of the alternating current fields changes with the intensity of the particular alternating current. Accordingly the resulting field will be displaced more or less according to the load. The iron core will be utilized most favourably, if the condition that the positive maximum of the one field coincides with the negative maximum of the other, is fulfilled at normal load. The inductor winding will therefore be so arranged that at no load the positive maximum of the one, and the negative maximum of the other are displaced against each other and do not coincide until load is reached.

In case of a synchronous machine which serves as a frequency changer it must further be considered that a synchronous motor with given voltage, inductor current and magnetizing current for the resulting field cannot exceed a certain maximum value of torque and will fall out of step if loaded beyond this maximum. One can avoid exceeding the permissible maximum torque by using the electrical features of the machine, i. e., the number of turns of the winding, the strength of the field, etc., such that the angle of displacement between the resulting field and the portion belonging to the inductor current of the motor part is smaller than, or, at most, equal to the corresponding angle of displacement in the generator part.

As common winding for both inductor fields a progressive continuous current winding may be employed, if the throw is suitably chosen and the necessary terminals provided for both exciting currents, while the connections of the winding are being kept the same as for each of the two currents with separate windings. If, for instance, the pole numbers of the two fields have the ratio of 3:1, then the throw must be equal to triple the pole pitch of the field of the high pole number. Exactly the same thing applies if the pole number of the field of the high pole number is another uneven multiple of that of the low pole number. With a ratio of five of the pole numbers, the throw would have to be the quintuple of the pole pitch of the field of the high pole number, with a ratio of seven, it would be the septuple and, generally, with a ratio of $(2n+1):1$ it would be $2n+1$ times the pole pitch of the field of the high pole number.

The arrangement for the common continuous current exciting winding shown in Figures 17$^a$, 17$^b$ and 18 can be used to particular advantage. They are based on a ratio of 3:1 and six and two poles respectively for the two fields. Accordingly the winding consists of two star windings which are mechanically displaced, the one being composed of the three coils $a$, $c$, $e$, having the star points $S_1$, the second consisting of spools $b$, $d$, $f$, and having the star point $S_2$. Both star windings are displaced against one another by 60° and the free ends of the adjacent spools $a$ and $b$, $c$ and $d$, $e$ and $f$, are connected together. For the exciting current of the field of the low pole number the connections shown in Figure 17$^a$ are used, while for the other exciting field the connections shown in Figure 17$^b$. According to Figure 17$^a$ the leads A and B for the continuous exciting current are brought to the ends, which are connected together, of spools $a$ and $b$ and $c$ and $d$ respectively; hence the current which enters through A, flows to B in two parallel circuits, through $a$ and $c$ and also through $b$ and $d$, while spools $e$ and $f$ carry no current. According to Figure 17$^b$, the leads C and D of the continuous exciting current are connected to the two star points $S_2$ and $S_1$ and the current, which enters through C, flows to D through the winding in three parallel circuits, through spools $b$ and $a$, $d$ and $c$, $f$ and $e$. If both exciting currents are made to enter the winding simultaneously by connecting the leads C and D to the two star points $S_2$ and $S_1$ in Figure 17$^a$, they will simply superimpose themselves without influencing each other. Figure 18 shows the diagram of such a winding; in it the six winding circuits $a, b, c, d, e, f$, consist of two spools each of which are placed in adjacent slots and connected in series. The throw of these spools is one pole pitch of the field of the low pole number. The different winding circuits $a, b, c, d, e, f$, are displaced against each other by 60°, that is $\frac{1}{3}$ of the pole pitch of the field of the low pole number. The distribution of the current which results, is indicated in the figure by arrows, the upper line of arrows referring to the exciter current of the field of the high pole number, the lower line of arrows to the exciter current of the field of the low pole number. Each of the two currents can be adjusted and regulated at will without disturbing the other exciter current, since the terminal points for each are points of the same potential for the other.

The angle of displacement of the two star windings need not necessarily be exactly 60°; it can be a different angle. Thus the particular case is of interest in which the single spool sides cover only 30°, i. e. $\frac{1}{6}$ of the pole pitch of the field of the low pole number. In order to improve the field curve, a further alteration can be introduced by making the single spool sides to overlap and by arranging them with varying numbers of conductors; for instance, each spool side can be made 60° broad and with an increased number of conductors in the middle slots.

A further important alternative in the construction of the machine is based on the principle of employing separate armature windings, but making each to serve at the same time as the exciter winding for the other. To this end, the one armature winding is arranged on the stationary, the other armature winding on the revolving part of the machine. The windings can, in that case, be arranged as indicated diagrammatically in Figure 19.

In this case the stator winding $W_1$ as well as the rotor winding $W_2$ is connected to a transformer, the three phases $a, b, c$ of the stator winding $W_1$ being connected in star, in the same way as the primary winding of the corresponding transformer $T_1$. Between the two star points the source of the exciting current $G_1$ and the regulating resistance $R_1$ are placed. With the rotor winding $W_2$, each of the three phases consists of three spools $a_1, a_2, a_3, b_1, b_2, b_3, c_1, c_2, c_3$, of which the middle spools $a_2, b_2, c_2$ are tapped off at the middle and connected to a neutral point; similarly the middle points of the primary windings of the transformer $T_2$. The source of the exciting direct current $G_2$ is again connected to the two neutral points through a regulating resistance $R_2$. The winding $W_1$ must furnish the six-pole exciting field for the rotor current of 50 periods, the winding $W_2$ the two-pole field for the stator current of $16\frac{2}{3}$ periods.

Figure 19:
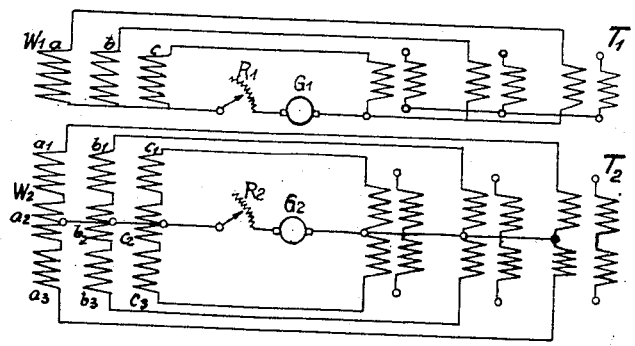
Figures 19 to 21 show an alternative construction of the machine.
Figure 20:
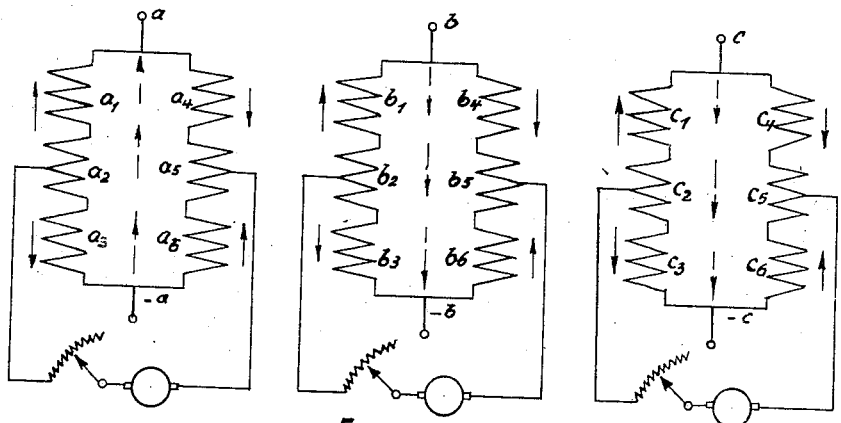
Figure 21:
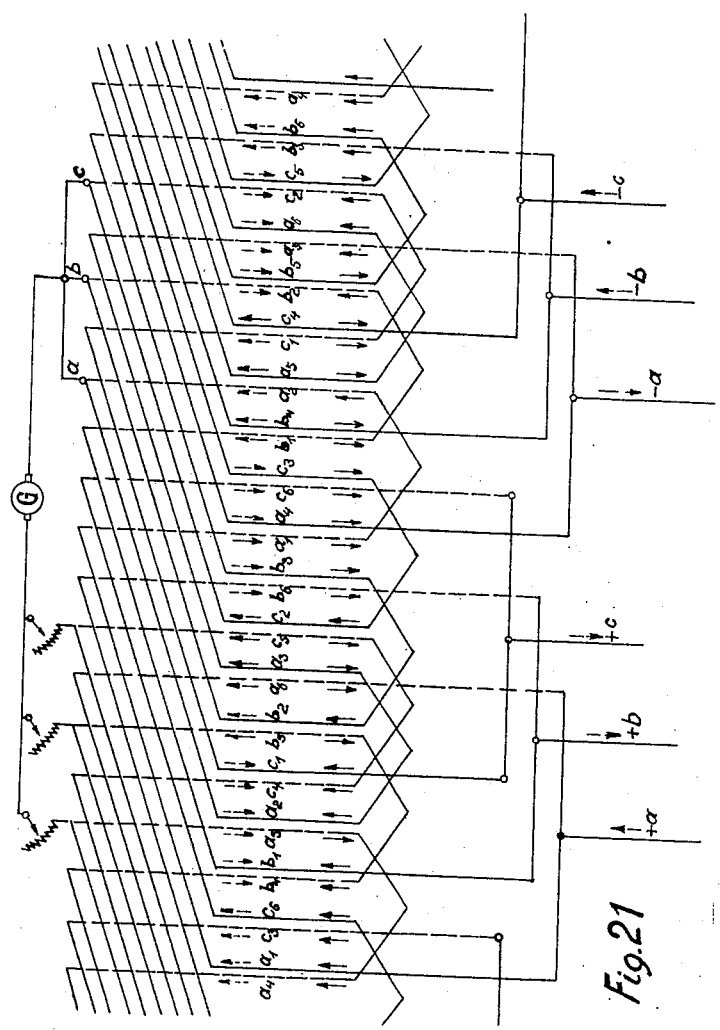

Instead of introducing the exciting direct current by using a neutral point of the transformer winding in accordance with Fig. 19, the arrangement can be chosen so that the winding of the machine consists of parallel winding groups, the middle points of which are connected through the source of the exciting current. This applies for the stator winding as well as for the rotor winding. The latter is indicated in Fig. 20. Each phase is shown to have two winding groups, each being composed of three spools connected in series, for phase $a$, for instance, $a_1$—$a_2$—$a_3$ on the one side and $a_4$—$a_5$—$a_6$ on the other. The middle spools $a_2$ and $a_5$ are tapped off at the middle point, and the source of the exciting current is placed in the connecting circuit. Phases $b$ and $c$ are arranged in a similar manner. In this case it is not necessary that a separate exciting generator be used for each phase; in a similar manner as was shown in Fig. 19, the middle points of the winding groups can be jointed together to one neutral point, so that only one source of exciting current need be placed in the connecting circuit. The connection shown in Fig. 20 has, however, the advantage that the distribution of the direct current and, accordingly, the form of the field can be regulated to a great extent; the same result, however, can be reached by introducing fixed resistances of the desired size or adjustable regulating resistances into the various circuits of the exciting current. Such regulating resistances are indicated in Fig. 21, which shows the complete winding diagram for this type of winding for the high frequency current. According to this diagram, each of the three phase windings $a$, $b$ and $c$ consists of two parallel circuits, each composed of three spools connected in series and displaced against each other by 180°; the end of one winding circuit is connected to the beginning of the other, and the terminal points for the main current lie at this point of connection. Thus, for instance, the one winding circuit for phase $a$ consists of spools $a_1$, $a_2$ and $a_3$, the other of spools $a_4$, $a_5$ and $a_6$. The single spools are composed of two bars which are 180° apart from each other. The angle of displacement for the various phase windings, is 40°. In each of the parallel circuits tap-offs are placed on the middle spools, and those of the spools which belong together joined together to form a neutral point. The tap-offs on each of the spools $a_2$, $b_2$ and $c_2$ are directly connected together, while the neutral point of each of the spools $a_5$, $b_5$ and $c_5$ is formed by placing resistances into the connecting circuits. The source of the exciting direct current lies between the neutral points obtained in this manner. The direct current feeding phase $a$ flows on the one hand through the one half of spool $a_2$, spools $a_1$ and $a_6$, and one half of spool $a_5$; on the other hand through the other half of spool $a_2$, spools $a_3$ and $a_4$, and the other half of spool $a_5$; similarly for the other two phases $b$ and $c$. With respect to the main current the following conditions obtain; in phase $a$ spools $a_1$, $a_2$ and $a_3$ on the one hand and spools $a_6$, $a_5$, and $a_4$ on the other are connected in series and in phases $b$ and $c$ the order is again the same. At the instance in which the main current in phase $a$ has its maximum, we have a distribution of currents in the various conductors which is indicated by full arrows for the direct current and by dotted arrows for the alternating current. Thus the winding forms at once a six-pole armature winding and a two-pole exciter winding. In case the spool sides extend over several slots the middle spools which carry the tap-offs are usefully so arranged that each of the spool sides is distributed over all the slots and not the one spool side in one half of the slot, the other in the other half.

In principle the various alternatives given for the introduction of the direct current can be readily used for the armature winding of the high frequency as well as for the armature winding of the low frequency, and it is merely a question of practicability whether the one or the other alternative is to be adopted. Only the construction of the winding itself is different in the two cases, since in one case it must comply with the conditions for the high frequency winding and in the other with those for the low frequency winding. For the armature winding of the low frequency it is useful to employ a shortened throw in order thereby to obtain a better form for the high frequency exciter field.

Obviously there may, in the actual construction of the new machine, various special points to be taken into consideration which, however, cannot be mentioned here in detail. Only for machines of the asynchronous type it may be especially mentioned that, with regard to the two alternating currents of different frequency, a construction can be adopted by which a common short-circuited (squirrel-cage) winding for both parts is arranged on the rotor; or instead of this one common phase winding, or, finally, a winding which acts as a phase winding with respect to the one alternating current and as a squirrel-cage winding with respect to the other. For a machine which is constructed as a synchronous one for the one frequency and as an asynchronous one for the other, in general separate windings will be used. The secondary winding for the asynchronous part can again be executed as a squirrel-cage or as a phase winding. The squirrel-cage winding acts in that case also as a damper winding for the other alternating current, and the phase winding can easily be executed in such way that it has the effect of a damper winding.

What I claim as my invention and desire to secure by United States Letters Patent is—

1. An alternating current machine which has exciting windings for two inductor fields of pole numbers differing in an uneven ratio of $2n+1):1$, and armature windings corresponding to these, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number.

2. An alternating current machine which has on a common field magnet body exciting windings for two inductor fields of pole numbers differing in an uneven ratio of $(2n+1):1$, and, corresponding to these, armature windings on a common armature core, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number.

3. An alternating current machine which has on a common field magnet body exciting windings for two inductor fields of pole numbers differing in an uneven ratio of $(2n+1):1$, and, corresponding to these, armature windings on a common armature core, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number, and both armature windings forming mechanically one common winding.

4. An alternating current machine which has on a common field magnet body exciting windings for two inductor fields of pole numbers differing in an uneven ratio of $(2n+1):1$, and, corresponding to these, armature windings on a common armature core, these armature windings forming mechanically one common winding, which common armature winding is fitted with terminal points in such a manner that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number.

5. An alternating current machine which has on a common field magnet body exciting windings for two inductor fields of pole numbers differing in an uneven ratio of $(2n+1):1$, and, corresponding to these, armature windings on a common armature core, these armature windings forming mechanically one common winding, which common armature winding is fitted with terminal points in such a manner that, with respect to the one system of terminal points, it is composed of groups of two conductors connected in series and lying at a distance from each other which equals an even number of poles of the field of the high pole number, and, with respect to the other system of terminal points of groups of $2n+1$ conductors connected in series and lying at a distance from each other which equals one pole pitch of the field of the high pole number, and that the winding between the first mentioned system of terminal points forms part of the winding which lies between the second system of terminal point.

6. An alternating current machine which has on a common field magnet body exciting windings for two inductor fields of pole numbers differing in an uneven ratio of $(2n+1):1$, and, corresponding to these, armature windings on a common armature core, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number, and both armature windings forming mechanically one common winding which consists of a number of phase windings which are equal but peripherally displaced against each other.

7. An alternating current machine which has on a common field magnet body exciting windings for two inductor fields of pole numbers differing in an uneven ratio of $(2n+1):1$, and, corresponding to these, armature windings on a common armature core, these armature windings forming mechanically one common winding, which common armature winding consists of a number of phase windings which are equal but peripherally displaced against each other and is fitted with terminal points in such a manner that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number.

8. An alternating current machine which has on a common field magnet body exciter windings for two inductor fields of pole numbers differing in an uneven ratio of $(2n+1):1$, and, corresponding to these, armature windings on a common armature core, these armature windings forming mechanically one common winding which common armature winding consists of a number of phase windings which are equal but peripherally displaced against each other, and is fitted with terminal points in such a manner that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number, and that the winding between the first mentioned system of terminal points forms part of the winding which lies between the second system of terminal points.

9. An alternating current machine of the synchronous type which has exciting windings for two inductor fields of pole numbers differing in an uneven ratio of $(2n+1):1$, means for adjusting the single fields, and armature windings corresponding to these, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number.

10. An alternating current machine of the synchronous type which has on a common field magnet body exciting windings for two inductor fields of pole numbers differing in an uneven ratio of $(2n+1):1$, means for adjusting the single fields, and, corresponding to these, armature windings on a common armature core, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number.

11. An alternating current machine of the synchnonous type which has on a common field magnet body exciting windings for two inductor fields of pole numbers differing in an uneven ratio of $(2n+1):1$, means for adjusting the single fields, and, corresponding to these, armature windings on a common armature core, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number, and both armature windings forming mechanically one common winding.

12. An alternating current machine of the synchronous type which has on a common field magnet body exciting windings for two inductor fields of pole numbers differing in an uneven ratio of $(2n+1):1$, means for adjusting the single fields, and, corresponding to these, armature windings on a common armature core, these armature windings forming mechanically one common winding, which common armature winding is fitted with terminal points in such a manner that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number.

13. An alternating current machine of the synchronous type which has on a common field magnet body exciting windings for two inductor fields of pole numbers differing in an uneven ratio of $(2n+1):1$, means for adjusting the single fields, and, corresponding to these, armature windings on a common armature core, these armature windings forming mechanically one common winding, which common armature winding is fitted with terminal points in such a manner that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number, and that the winding between the first mentioned system of terminal points forms part of the winding which lies between the second system of terminal points.

14. An alternating current machine of the synchronous type which has on a common field magnet body exciting windings for two inductor fields of pole numbers differing in an uneven ratio of $(2n+1):1$, means for adjusting the single fields, and, corresponding to these, armature windings on a common armature core, the one armature winding being composed of groups of two conductors connected in series and lying at a distance from each other which equals an even number of poles of the field of the high pole number, the other armature winding being composed of groups of $2n+1$ conductors connected in series and lying at a distance from each other which equals one pole pitch of the field of the high pole number, and both armature windings forming mechanically one common winding which consists of a number of phase windings which are equal but peripherally displaced against each other.

15. An alternating current machine of the synchronous type which has on a common field magnet body exciting windings for two inductor fields of pole numbers differing in an uneven ratio of $(2n+1):1$, means for adjusting the single fields, and, corresponding to these, armature windings on a common armature core, these armature windings forming mechanically one common winding, which common armature winding consists of a number of phase windings which are equal but peripherally displaced against each other, and is fitted with terminal points in such a manner, that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number.

16. An alternating current machine of the synchronous type which has on a common field magnet body, exciting windings for two inductor fields of pole numbers differing in an uneven ratio of $(2n+1):1$, means for adjusting the single fields, and, corresponding to these, armature windings on a common armature core, these armature windings forming mechanically one common winding which common armature winding consists of a number of phase windings which are equal but peripherally displaced against each other, and is fitted with terminal points in such a manner that, with respect to the one system of terminal points, it is composed of groups of two conductors connected in series and lying at a distance from each other which equals an even number of poles of the field of the high pole number, and, with respect to the other system of terminal points, of groups of $2n+1$ conductors connected in series and lying at a distance from each other which equals one pole pitch of the field of the high pole number, and that the winding between the first mentioned system of terminal points forms part of the winding which lies between the second system of terminal points.

In testimony whereof I have signed my name to this specification in presence of two witnesses.

PAUL MÜLLER.

Witnesses:
GEORGE MÜLLER,
FRIEDRICH DIRKENHIED.